United States Patent
Asprion et al.

(10) Patent No.: US 10,569,192 B2
(45) Date of Patent: Feb. 25, 2020

(54) DISTILLATION DEVICE COMPRISING A COLUMN WHICH AS THREE OR A PLURALITY OF CELLS IN SERIES THROUGH WHICH FLUID FLOWS AND METHOD FOR DISTILLING OR EXTRACTIVE DISTILLATION BY USE OF THE DISTILLATION DEVICE

(71) Applicant: BASF SE, Ludwigshafen (DE)

(72) Inventors: Norbert Asprion, Ludwigshafen (DE); Bernd Heida, Ellerstadt (DE); Jan-Oliver Weidert, Schifferstadt (DE); Ortmund Lang, Quirnbach (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/741,350

(22) PCT Filed: Jun. 29, 2016

(86) PCT No.: PCT/EP2016/065092
§ 371 (c)(1),
(2) Date: Jan. 2, 2018

(87) PCT Pub. No.: WO2017/005565
PCT Pub. Date: Jan. 12, 2017

(65) Prior Publication Data
US 2018/0361270 A1 Dec. 20, 2018

(30) Foreign Application Priority Data

Jul. 3, 2015 (EP) .................................... 15175275

(51) Int. Cl.
*B01D 3/14* (2006.01)
*B01D 3/32* (2006.01)
(Continued)

(52) U.S. Cl.
CPC ............. *B01D 3/322* (2013.01); *B01D 3/143* (2013.01); *B01D 3/326* (2013.01); *B01D 3/40* (2013.01);
(Continued)

(58) Field of Classification Search
CPC ........ B01D 3/322; B01D 3/065; B01D 3/141; B01D 3/143; B01D 3/146; B01D 3/148; B01D 3/32; B01D 3/14
(Continued)

(56) References Cited

U.S. PATENT DOCUMENTS 3,442,767 A * 5/1969 Hall ....................... B01D 3/322
202/153
4,490,215 A * 12/1984 Bannon .................... B01D 3/14
196/111
(Continued)

FOREIGN PATENT DOCUMENTS

EP      0 366 019 A1    5/1990
EP      0 589 230 A1    3/1994
(Continued)

OTHER PUBLICATIONS

International Search Report dated Nov. 9, 2016 in PCT/EP2016/065092, (with English translation), 7 pages.
(Continued)

*Primary Examiner* — Jonathan Luke Pilcher
(74) *Attorney, Agent, or Firm* — Oblon, McClelland, Maier & Neustadt, L.L.P.

(57) ABSTRACT

A distillation device comprising a column for separating a feed stream into a head product stream, a bottom product stream and optionally one or more side extraction streams, having three or more cells in 5 series through which fluid flows, wherein at least the first cell is integrated into the bottom of the column, for multi-stage heating and partial (Continued)

evaporation of the liquid flowing through the cells with the exception of the liquid from the last cell in an evaporation stage.

18 Claims, 14 Drawing Sheets

(51) Int. Cl.
    *B01D 3/40*                 (2006.01)
    *B01D 5/00*                 (2006.01)

(52) U.S. Cl.
    CPC .................. *B01D 3/14* (2013.01); *B01D 3/32* (2013.01); *B01D 5/0063* (2013.01)

(58) Field of Classification Search
    USPC ......................................................... 202/153
    See application file for complete search history.

(56) References Cited

U.S. PATENT DOCUMENTS

| | | | | |
|---|---|---|---|---|
| 4,601,788 | A * | 7/1986 | Bannon | B01D 3/322 196/111 |
| 5,303,769 | A | 4/1994 | Hoegberg | |
| 5,772,854 | A * | 6/1998 | Nelson | B01D 3/322 203/64 |
| 6,048,441 | A * | 4/2000 | Auer | B01D 3/148 159/6.2 |
| 8,052,845 | B2 * | 11/2011 | Zuber | B01D 3/14 137/262 |
| 9,409,838 | B2 * | 8/2016 | Schwint | B01D 3/40 |
| 9,630,900 | B2 | 4/2017 | Blaschke | |
| 9,809,526 | B2 | 11/2017 | Blaschke | |
| 2004/0020757 | A1 | 2/2004 | Deibele et al. | |
| 2008/0161618 | A1 | 7/2008 | Zimmermann et al. | |
| 2008/0251127 | A1 * | 10/2008 | Zuber | B01D 3/14 137/1 |
| 2009/0032389 | A1 | 2/2009 | Deibele et al. | |
| 2014/0124358 | A1 * | 5/2014 | Schwint | B01D 3/40 203/50 |
| 2014/0179975 | A1 * | 6/2014 | Banerjee | C07C 7/04 585/826 |
| 2014/0183032 | A1 * | 7/2014 | Sigwart | B01D 3/141 203/74 |
| 2019/0031581 | A1 * | 1/2019 | Asprion | B01D 3/007 |

FOREIGN PATENT DOCUMENTS

| | | |
|---|---|---|
| EP | 1 362 625 A1 | 11/2003 |
| WO | WO 2012/117085 A1 | 9/2012 |
| WO | WO 2013/120520 A1 | 8/2013 |
| ZA | 9 704 354 B | 8/1998 |

OTHER PUBLICATIONS

International Preliminary Report on Patentability dated Jun. 12, 2017 in PCT/EP2016/065092 filed Jun. 29, 2016 (with English translation), 19 pages.
Henri Renon, et al., "Local Compositions in Thermodynamic Excess Functions for Liquid Mixtures" AIChE Journal, vol. 14, No. 1, Jan. 1968, pp. 135-144.
U.S. Appl. No. 15/021,286, filed Mar. 11, 2016, 2016-0221916, Blaschke, Tim.
U.S. Appl. No. 15/529,133, filed May 24, 2017, 2017-0260115, Weidert, Jan-Oliver.
U.S. Appl. No. 15/323,802, filed Jan. 4, 2017, 2017-0158583, Heida, Bernd.

* cited by examiner

DISTILLATION DEVICE COMPRISING A COLUMN WHICH AS THREE OR A PLURALITY OF CELLS IN SERIES THROUGH WHICH FLUID FLOWS AND METHOD FOR DISTILLING OR EXTRACTIVE DISTILLATION BY USE OF THE DISTILLATION DEVICE

FIELD OF THE INVENTION

The invention relates to a distillation apparatus comprising a column having three or more serially liquid-traversed cells and to a process for distillation or extractive distillation using said distillation apparatus.

Large industrial-scale processes for fractionation of substance mixtures by distillation and in particular by extractive distillation are often very energy intensive. Hence in known plants the bottoms liquid is often subjected to multistage heating, particularly in serially connected evaporators. This forms a biphasic liquid/vapor mixture in each case, which needs to be uniformly distributed during transfer from one evaporator stage to the next. This can be achieved in simple fashion by arranging the individual evaporator stages vertically one on top of another though this has the disadvantage that the columns which are already relatively tall without this measure need to be made even taller which results in corresponding construction difficulties, particularly stability problems, and corresponding costs to overcome these difficulties.

The abovementioned problem could be avoided by a horizontal arrangement of serially traversed evaporator stages but such an arrangement is disadvantageous due to the distribution problems encountered when a biphasic mixture from one evaporator stage enters the next evaporator stage.

It was accordingly an object of the present invention to provide a distillation apparatus, particularly for large industrial-scale processes, which does not suffer from the abovementioned problems and which moreover makes it possible to utilize existing energy sources for the individual evaporator stages in recuperative fashion as adequately as possible, thus economizing on capital and energy costs.

The object is achieved by a distillation apparatus comprising a column for fractionating a feed stream into a tops product stream, a bottoms product stream and optionally one or more side draw streams each having prescribed specifications, having three or more serially liquid-traversed cells for multistage heating and part-evaporation of the liquid serially traversing the three or more cells, with the exception of the liquid from the last of the serially arranged cells, in one or more parallel evaporator stages in each case, to the temperature in the last of the serially arranged cells that is necessary for the bottoms product stream to be withdrawable therefrom with the prescribed specification, wherein the heating and part-evaporation of the liquid serially traversing the three or more cells in each of the evaporator stages, with the exception of the liquid from the last of the serially arranged cells, is effected using energy sources suitable in each case.

The thermal separation processes most commonly employed in the chemical industry are distillation processes.

Substance separation by distillation is based on the principle that, when partially evaporated/condensed, mixtures of substances having different boiling points accumulate in the vapor phase and the liquid phase to differing extents. Multistage distillation in distillation columns is generally performed by partial evaporation of the bottoms liquid and partial condensation of the tops output. The vapor from the evaporator and some of the condensate are recycled into the column. Separatory internals such as random packings, structured packings or trays achieve effective heat and material exchange between the descending liquid and the ascending vapor and thus, generally, separation performance equal to a plurality of serially connected theoretical vapor/liquid equilibrium stages.

For substance mixtures that are difficult to separate due to boiling points that are close together or on account of an unfavorable boiling order, addition of a liquid solvent can simplify the separation by virtue of different dissolution behavior of the substances in the liquid solvent. In contrast to absorption where typically no evaporator or condenser is employed, when a solvent is employed in the distillation column said distillation is referred to as extractive distillation. The separation achieved therewith is sometimes improved further by the formation of a second liquid phase.

Both distillation columns and extractive distillation columns have at least one evaporator integrated into the column bottom or at least one external evaporator connected to the column bottom, through which some or all of the energy required for the fractionation is introduced. Optionally some of the energy required for the fractionation may also be introduced via preevaporators and/or side evaporators disposed below the feed stream and above the bottom.

To this end it is often necessary, particularly in large industrial scale plants, to introduce large amounts of energy with the effect that the bottoms liquid needs to be heated in a plurality of stages.

Distillation columns in large industrial scale plants often have a diameter of from about 0.5 m to about 6 m or even 7 m, in particular between about 2 and 5 m. Distillation columns in large industrial scale plants are typically about 10-30 m or more in height. When used as natural circulation evaporators external tube bundle heat exchangers employed as an evaporator stage often have a length in the tube direction of about 2 to 3 m.

Said heat exchangers are configured for high flow rates: the bottoms product streams are often in the range of hundreds of tonnes per hour.

SUMMARY OF THE INVENTION

In accordance with the invention there is proposed a distillation apparatus, in particular for large industrial-scale separation processes, which ensures multistage heating and part-evaporation of the liquid and which, via the configuration specified hereinabove and elucidated in detail hereinbelow, allows staged partial evaporation of the liquid in a plurality of stages supplied with a single phase of liquid, and heating of said liquid to the temperature necessary for the liquid bottoms product stream to be withdrawable with the prescribed specification.

The invention proceeds from a distillation apparatus comprising, as is typical, a column for fractionating a feed stream comprising a plurality of components into a tops product stream, a bottoms product stream and optionally one or more side draw streams each having prescribed specifications.

The distillation apparatus proposed in accordance with the invention is provided with three or more cells serially arranged in the direction of the liquid stream. The liquid or a substream of the liquid from each of these cells, with the exception of the last of the serially arranged cells from which the bottoms product stream is withdrawn, is supplied in the form of a single phase of liquid to a respective evaporator stage for heating and part-evaporation.

The cells are in each case containers serially traversed by liquid and the liquid traversing each container is separately heated to a temperature, which in each case increases in the direction of flow, and partially evaporated. The temperature in the individual cells thus increases in the direction of flow while, simultaneously, on account of the part-evaporation, the concentration of low boiling components decreases.

These containers may be disposed in immediate proximity to one another or else arranged with a relatively large distance between one another. However, it is important that liquid cannot flow directly from the preceding container into the respective next container. By contrast partial reflux of the liquid from the next container into the respective preceding container is allowed in specific embodiments of the invention.

Two, three or all of the three or more cells may be integrated into the column bottom.

In one preferred embodiment the distillation apparatus comprises a column having a bottom divided into three parts, i.e. three serially liquid-traversed cells are integrated into the column bottom. To this end the lower column region is divided into three subregions by vertical dividing walls which project from the lower tray of the column into the lower column region up to a certain height, the height of the dividing walls between the individual subregions increasing in the direction of flow.

The dividing walls may in particular be concentric cylinders or flat dividing plates which, when viewed in the column cross section, are arranged along circle chords or circle radii.

One, two or all of the cells following the first liquid-traversed cell may be disposed outside the column bottom and may in particular be configured as the liquid-traversed part of a gas/liquid separator.

In accordance with the invention the liquid that traverses each of the three or more serially arranged cells, with the exception of the last of the serially arranged cells from which the bottoms product stream is withdrawn, is, in each case independently of one another, heated and part-evaporated in a respective evaporator stage with an energy source suitable in each case.

The specific configuration according to the invention of the distillation apparatus makes it possible in each case to heat a monophasic liquid stream with the available energy source best suited based on energy content. These suitable energy sources may be in-process energy sources and/or an external energy source.

Preferred energy sources are mass flows.

In a further configuration the energy source employed may also be electrical energy.

Preferred mass flows are steam or hot condensate.

The energy source employed may advantageously be steam or hot condensate generated in-process.

In a preferred embodiment the evaporator stages, into which liquid from each of the three or more serially liquid-traversed cells, with the exception of the finally liquid-traversed cell, is passed, heated therein and part-evaporated to obtain a part-evaporated stream in each case, which is completely or partially supplied to the respective next downstream cell, are configured as individual heat exchangers. These heat exchangers may in each case be attached as simple heat exchangers or else as a plurality of heat exchangers arranged in parallel.

The arrangement composed of a heat exchanger and a next downstream cell may also be replaced by a different, thermodynamically equivalent arrangement, in particular by a falling film evaporator or a kettle-type reboiler (kettle evaporator).

In falling film evaporators the liquid to be evaporated flows along a tube wall as an uninterrupted film.

Kettle evaporators or kettle-type evaporators are evaporators comprising a heatable tube bundle immersed in a liquid. The tube bundle and the liquid are disposed in a container which serves as a separator. Such evaporators are often used for generating heating steam from liquid water.

The heatable tube bundle is disposed, generally horizontally, in a relatively large container which serves as the separator. The liquid to be evaporated is supplied to the container in the region of the tube bundle and backed up by an overflow weir so that the tube bundle is immersed. The heating causes the liquid to boil so that bubbles are formed which, due to the large volume of the separator, are separated from the liquid and discharged from the upper region. The unevaporated liquid overflows at a weir and is then withdrawn from the evaporator (source: Wikipedia).

In these cases the evaporator stages correspond in each case to the tube bundle of the falling film evaporator/kettle evaporator of the container. The cells are formed by the bottom of the falling film evaporator/by the region of the kettle evaporator which is disposed next to the weir and in which the tube bundle heat exchanger of the kettle evaporator is not disposed.

A liquid reflux from one or more of the three or more serially liquid-traversed cells, with the exception of the cell liquid-traversed first, into the respective immediately preceding cell may preferably be provided, in particular as a direct liquid overflow over a weir, as an immersed feed or as a siphon.

The invention further provides a process for performing a distillation or extractive distillation using the distillation unit described hereinabove.

The process is for example a process for separating a feed stream (1) comprising the substances A and B by extractive distillation using an extractant having a higher affinity for B than for A, which comprises a) running the feed stream (1) in countercurrent to the extractant in the column (K) to obtain a tops product stream (2) comprising A and a liquid comprising B and extractant, b) allowing the liquid comprising B and extractant in column to flow out into the first cell integrated into the bottom of column (K), c) passing liquid from each of the three or more cells (I, II, III) except the last cell through respective evaporator stages and thus heating and part-evaporating them therein to obtain respective part-evaporated streams (4, 5) which are each completely or partially supplied to the respective next cell in the direction of flow and d) withdrawing of the bottoms product stream (3) from the last cell.

In one embodiment of the process A stands for butane and B stands butene. In another embodiment of the process A stands for butene and B stands for 1,3-butadiene.

In the process according to the invention the extractant has a higher affinity for B than for A, i.e. the extractant undergoes stronger interactions with B than with A. A person skilled in the art can determine the affinity of the extractant for A/for B by determining the solubility of A/B in the extractant. For example said person can stir a respective aliquot of extractant under an atmosphere of A and an atmosphere of B and determine how much of A/B has dissolved in the extractant.

When A stands for butane and B stands for butene and when A stands for butene and B stands for 1,3-butadiene the extractant may be selected for example from dimethylformamide, N-methylpyrrolidone, acetonitrile, furfural and dimethyl sulfoxide. When A stands for butene and B stands for 1,3-butadiene an N-methylpyrrolidone-comprising extractant preferably comprising 85 to 95 wt % of N-methylpyrrolidone and 6 to 12 wt % of water is employed for example.

One embodiment of the process according to the invention relates to a process for separating butane and butene by extractive distillation. The feed stream comprises one or more isomeric butenes in addition to one or more isomeric butanes. In addition to butane(s) and butene(s) the stream may in particular also comprise butadiene(s) which then accumulate in addition to the butene(s) in the bottoms product stream.

Another embodiment of the process according to the invention relates to a process for separating butane and butadiene by extractive distillation. The feed stream comprises butadiene(s) in addition to one or more isomeric butenes. In addition to butene(s) and butadiene(s) the stream may in particular also comprise butane(s), butane(s) and butene(s) accumulating in the tops product stream and butadiene(s) accumulating bottoms product stream extractant.

The process may particularly advantageously be an extractive distillation for fractionating a reaction mixture from the dehydrogenation of butanes to produce butenes or from an oxydehydrogenation of butanes to produce butadiene. In the case of extractive distillations a particularly suitable energy source is the hot regenerated solvent.

BRIEF DESCRIPTION OF THE DRAWINGS

The invention is more particularly elucidated hereinbelow with reference to a drawing and an illustrative embodiment.

In the figures identical reference numerals describe respective identical or corresponding features.

Figure 1:
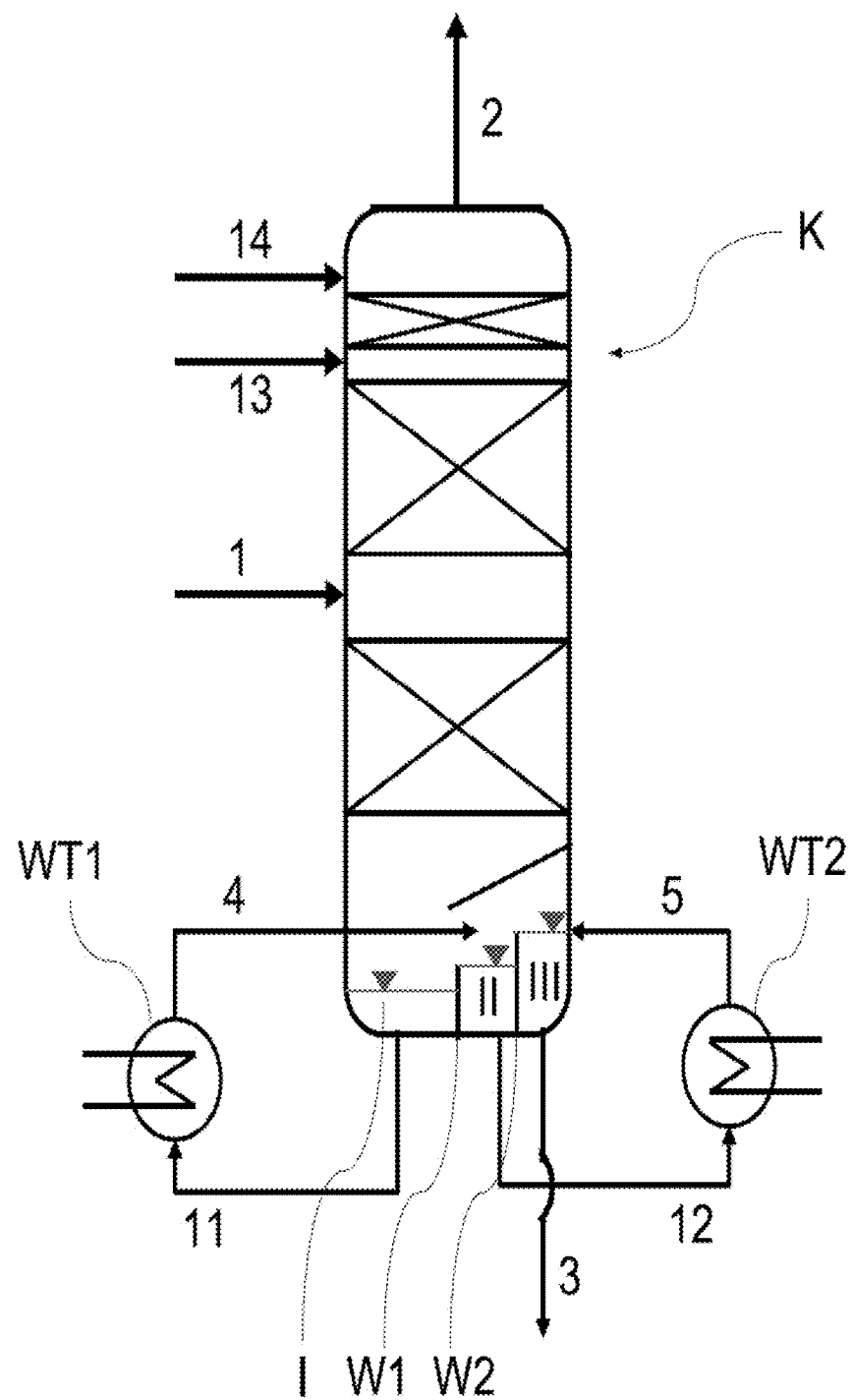
Figure 1A:
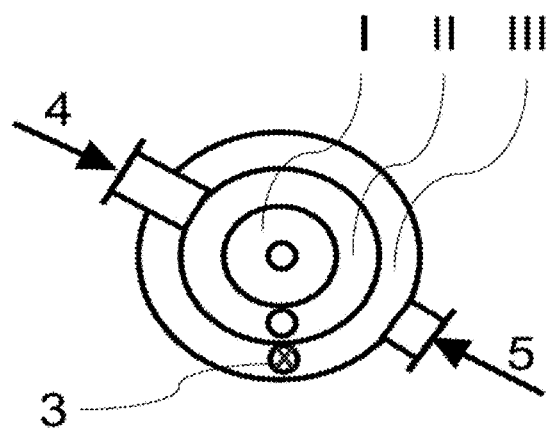
Figure 1B:
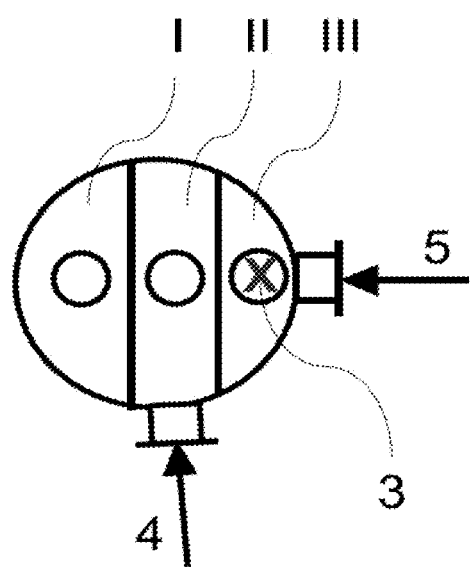
Figure 1C:
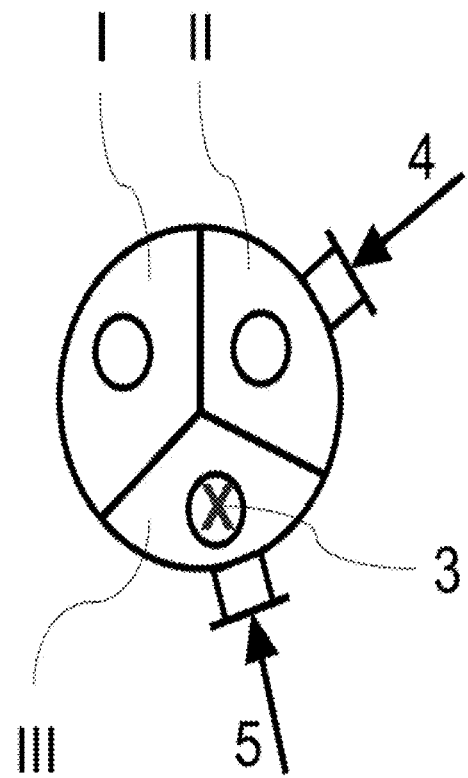
Figure 2:
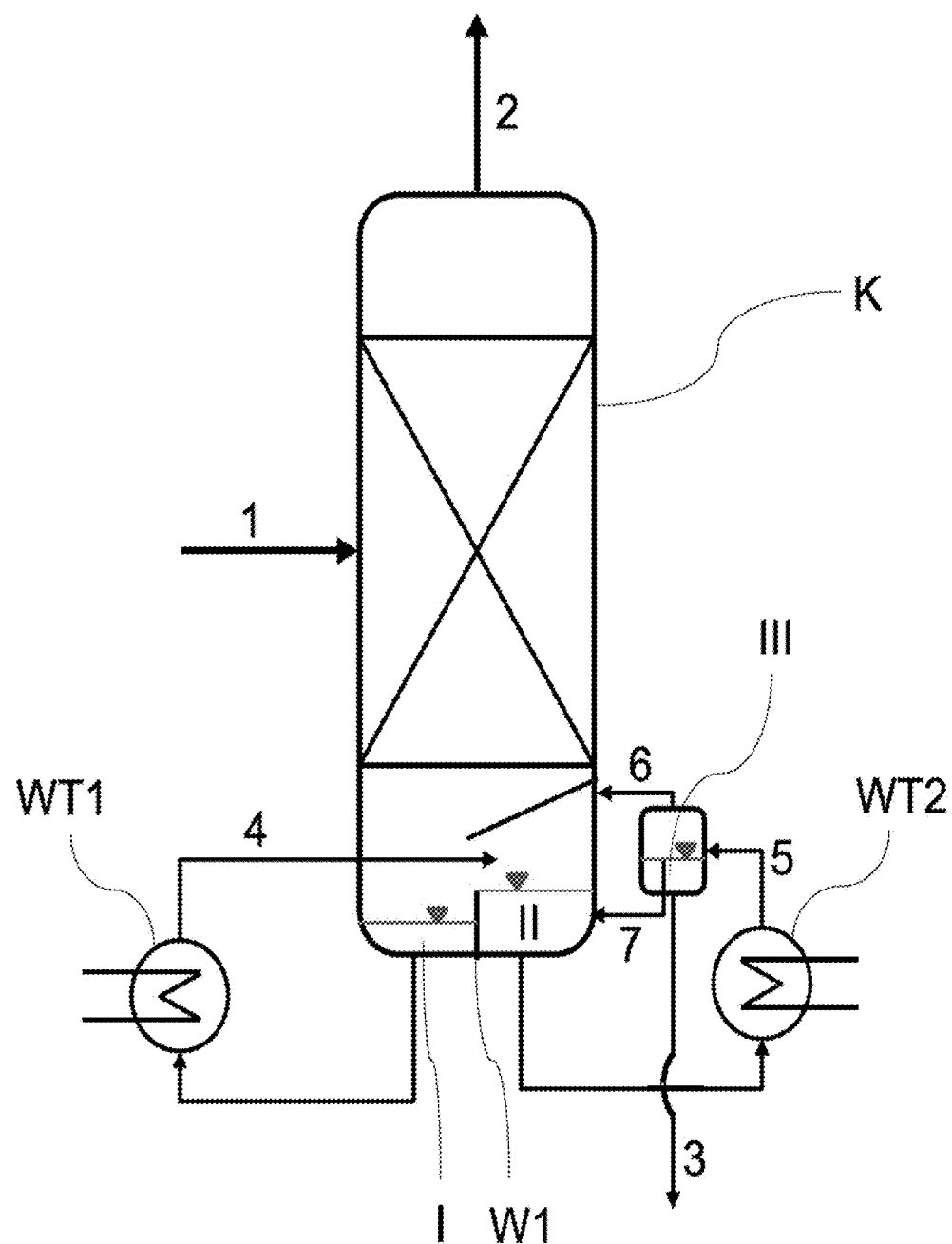
Figure 2A:
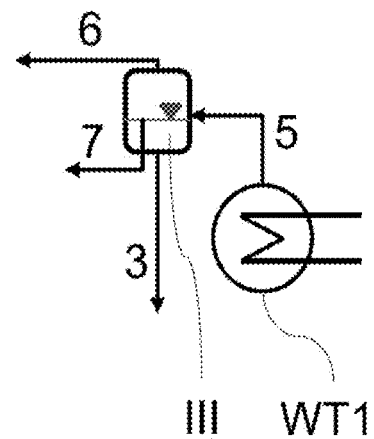
Figure 2B:
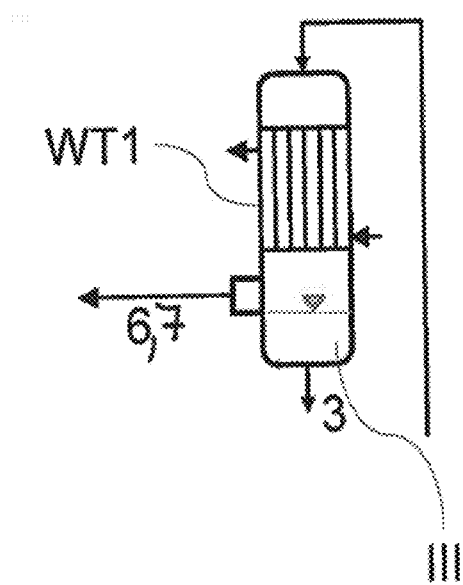
Figure 2C:
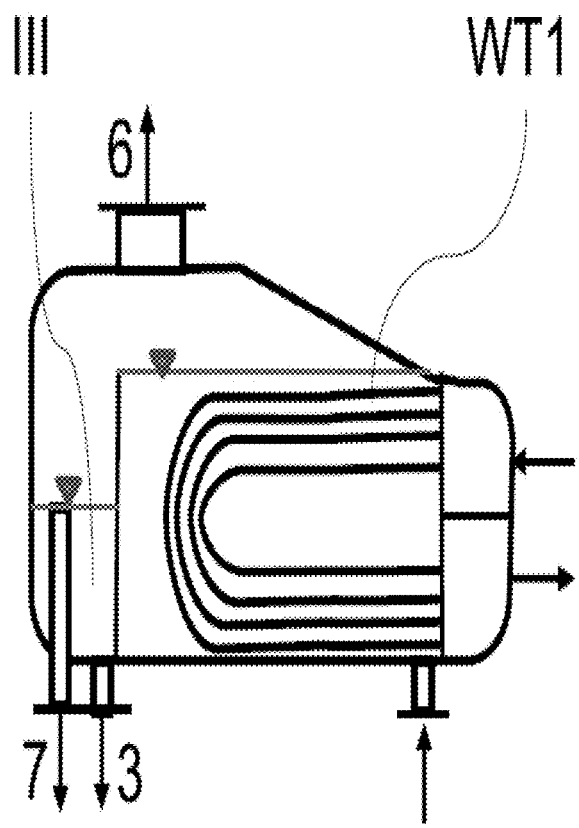
Figure 3:
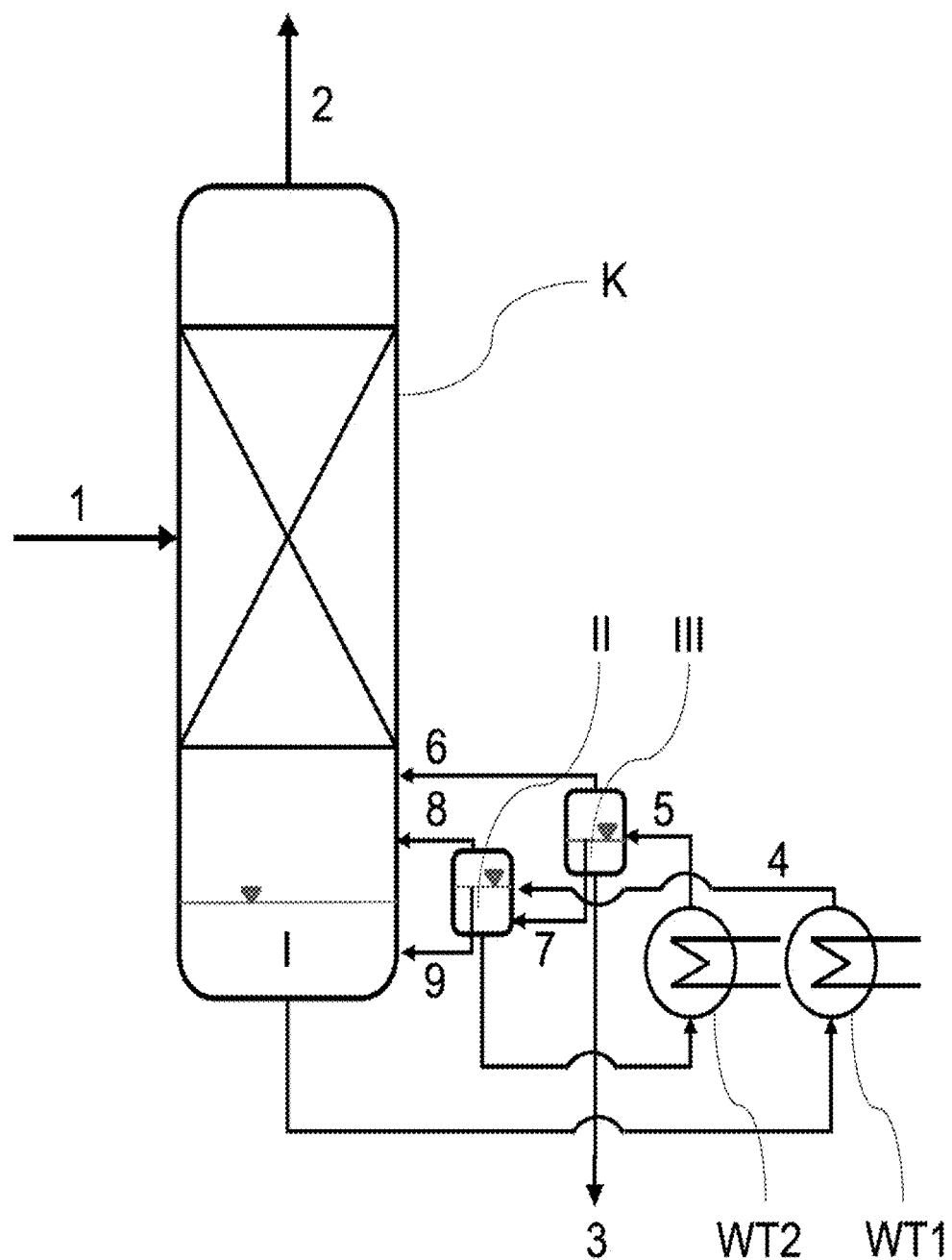
Figure 4:
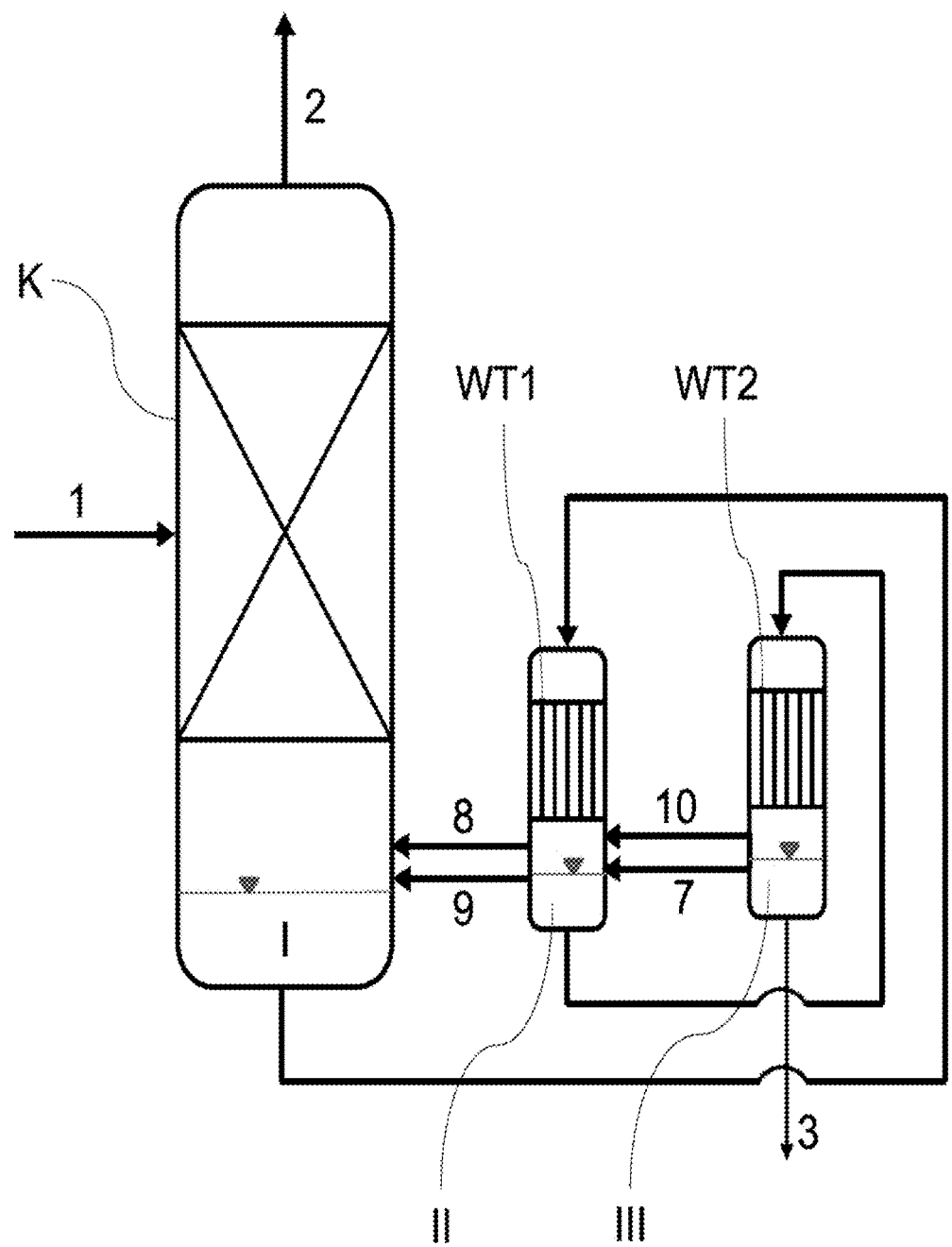
Figure 5:
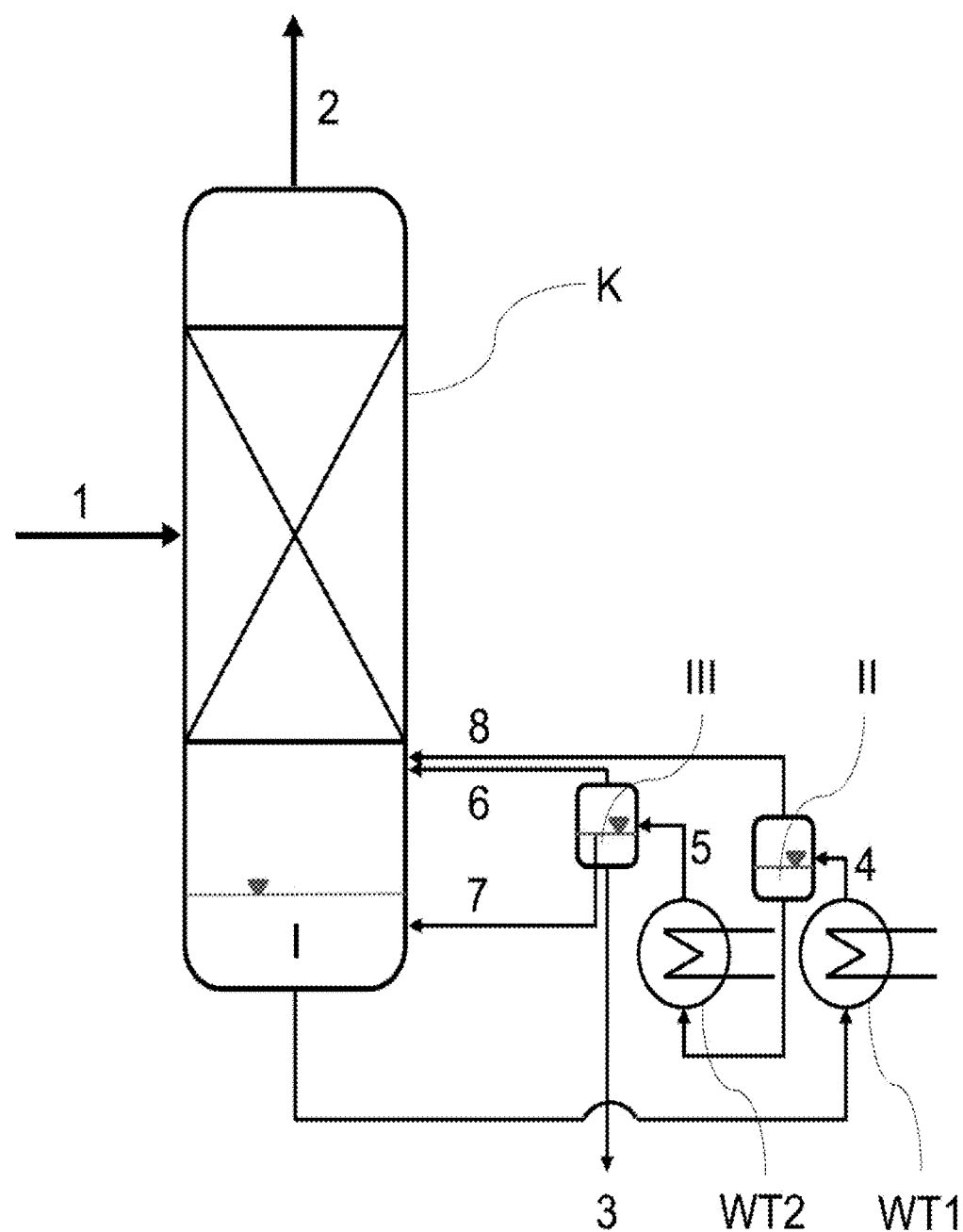
Figure 6:
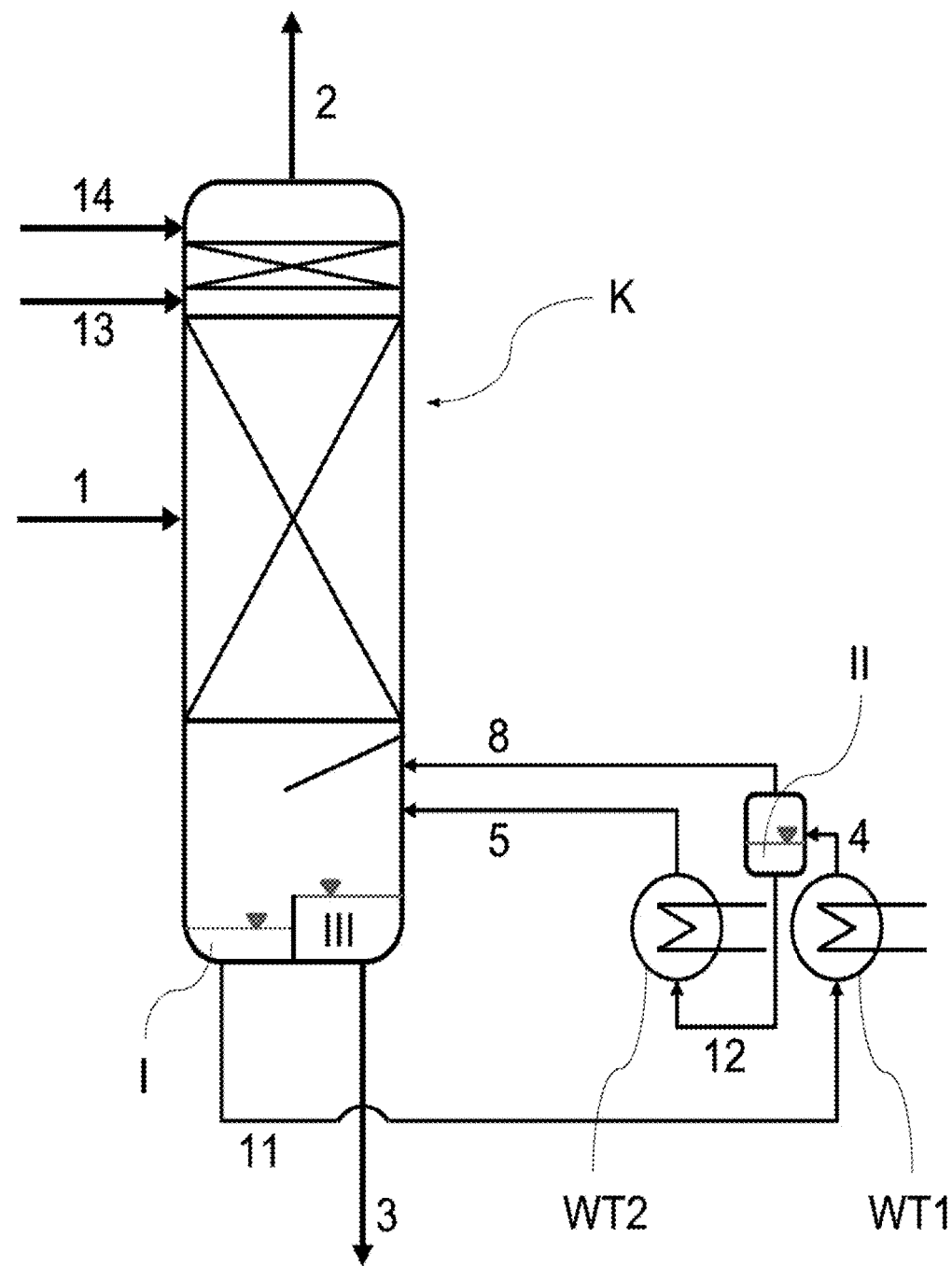
Figure 7:
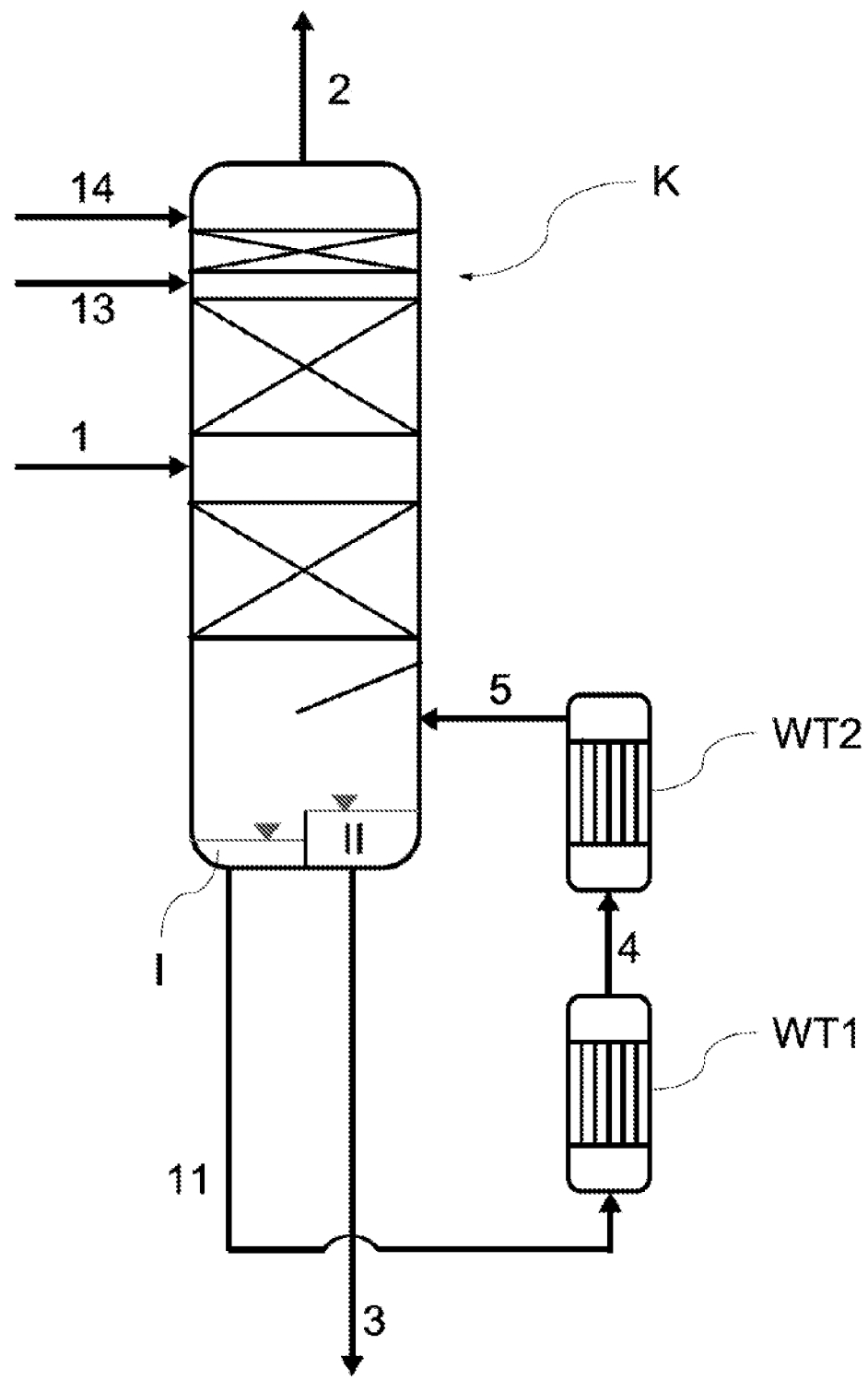
Figure 8:
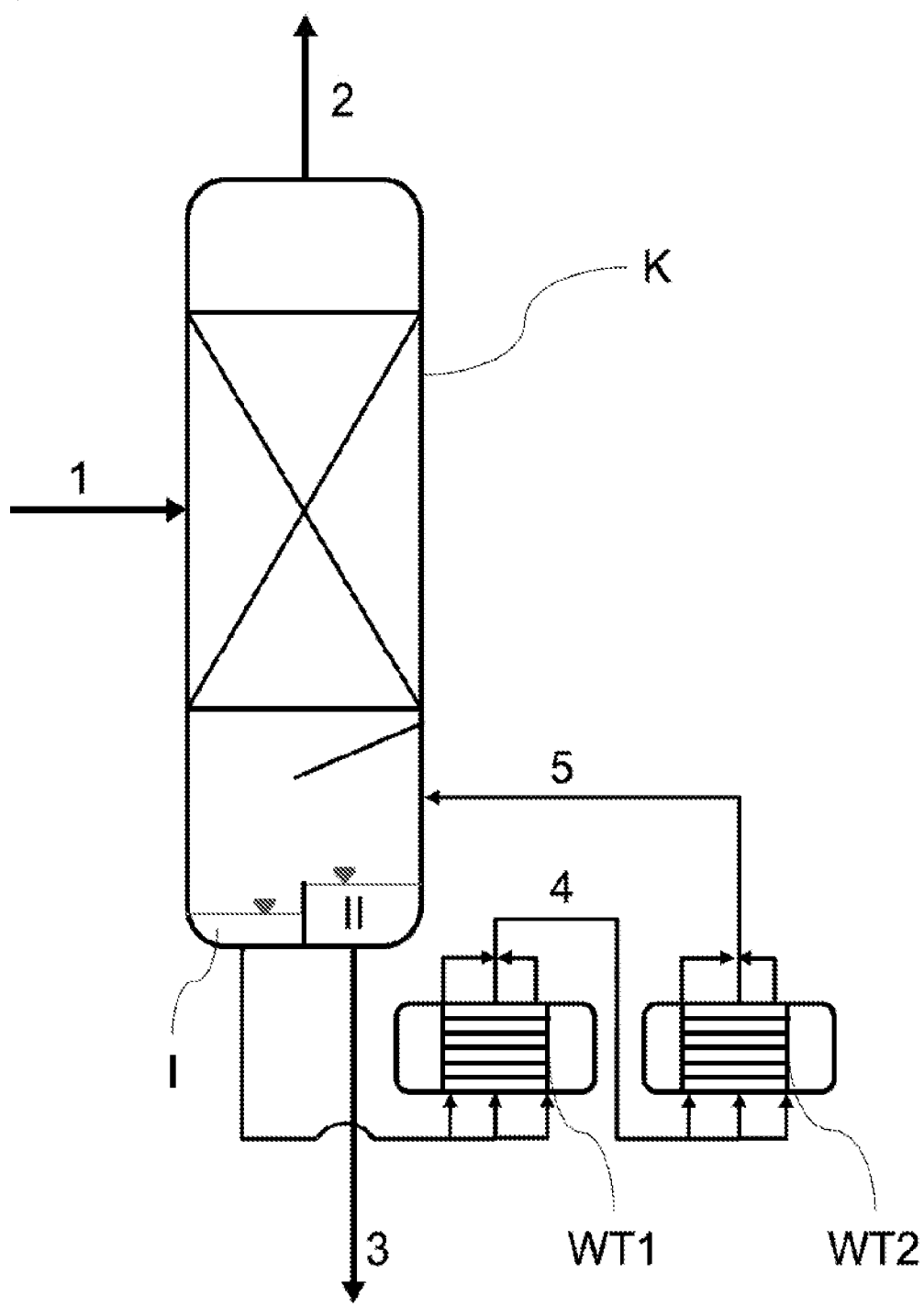
Figure 9:
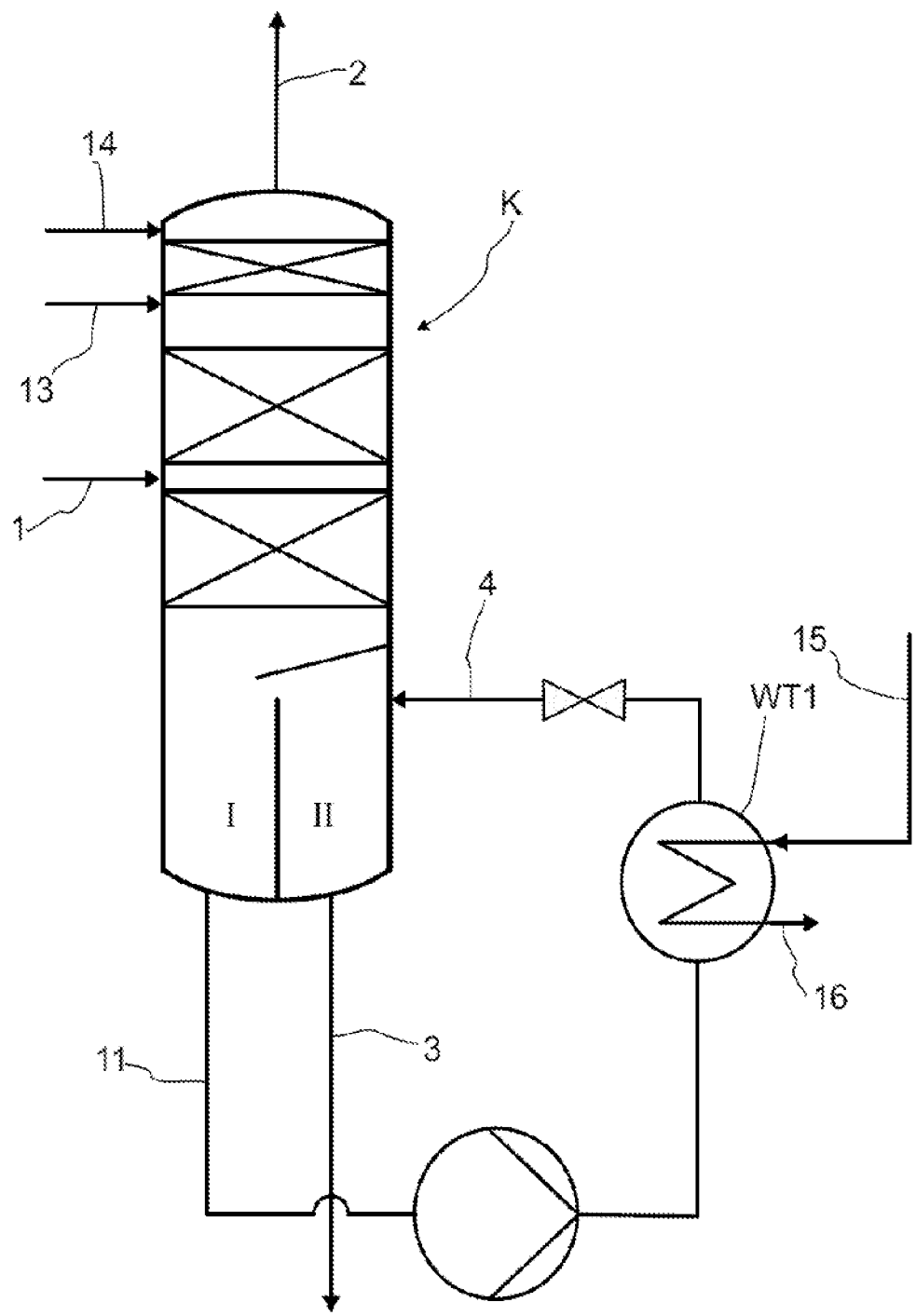
Figure 10:
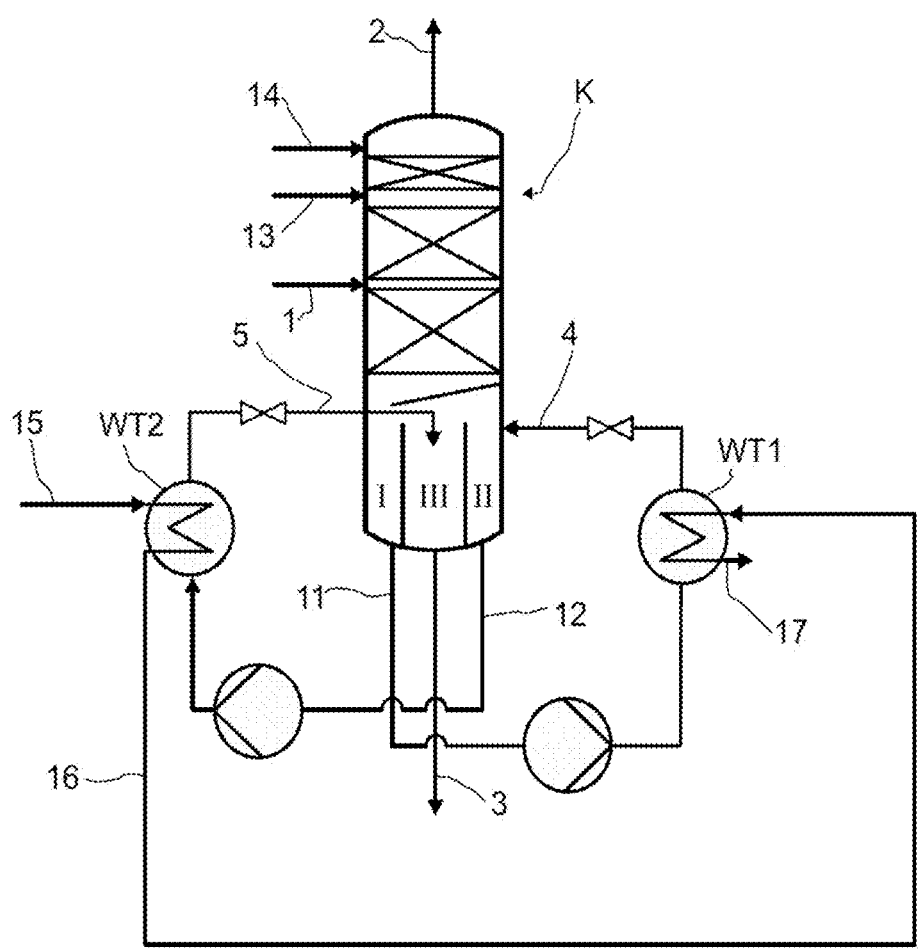

In particular:

FIG. 1 shows a schematic representation of a preferred embodiment of a distillation apparatus according to the invention having a bottom divided into three parts, cross-sectional representations for preferred configurations of the dividing walls in the column bottom being shown in FIGS. 1A to 1C;

FIG. 2 shows a schematic representation of a further preferred embodiment of a distillation apparatus according to the invention having two cells integrated into the column bottom and a third cell III disposed outside the column and configured as a phase separator, further variants for the cell III disposed outside the column K with heat exchanger WT2 (depicted in detail in FIG. 2A) being shown in FIGS. 2B and 2C;

FIG. 3 shows a schematic representation of a further embodiment for a preferred distillation apparatus having two cells II and III disposed outside the column K;

FIG. 4 shows a further variant for a preferred distillation apparatus having two cells II and III disposed outside the column K;

FIG. 5 shows a further variant for a preferred distillation apparatus having two cells II and III disposed outside the column K;

FIG. 6 shows a schematic representation of a distillation apparatus having column-integrated cells I and III and a cell II disposed outside the column;

FIG. 7 shows a prior art distillation apparatus with two-stage heating of the liquid from the column bottom in two heat exchangers arranged vertically one on top of the other;

FIG. 8 shows a schematic representation of a further embodiment of a prior art distillation apparatus with two-stage heating of the liquid from the column bottom in two horizontally serially arranged heat exchangers;

FIG. 9 shows a schematic representation of a further embodiment of a prior art distillation apparatus having a bottom divided into two parts and FIG. 10 shows a schematic representation of a preferred embodiment of a distillation apparatus according to the invention with a bottom divided into three parts.

DETAILED DESCRIPTION OF THE INVENTION

FIG. 1 shows a schematic representation of a preferred embodiment of a distillation apparatus according to the invention with a column K for fractionating a feed stream 1 into a tops product stream 2 with a bottoms product stream 3, with three serially liquid-traversed cells I, II and III, wherein all liquid-traversed cells I-III are integrated into the bottom of the column K and are separated from one another by weirs W1, W2. The bottoms stream from the cell I which is first in the direction of flow is withdrawn and supplied to the heat exchanger WT1 in which the stream is heated and partially evaporated to obtain a part-evaporated stream 4 which is supplied to the second cell II. The bottoms stream from the second cell II is likewise withdrawn in liquid form and heated in an external heat exchanger WT2 and partially evaporated and supplied as part-evaporated stream 5 to the third liquid-traversed cell III.

The cross-sectional representations in the FIGS. 1A-1C each show preferred arrangements for the dividing walls for dividing the column bottom into the three serially arranged liquid-traversed cells I-III: a concentric arrangement of the dividing walls in FIG. 1A, an arrangement in the shape of circle chords in FIG. 1B and an arrangement in the shape of circle radii in FIG. 1C.

FIG. 2 shows a schematic representation of a further preferred embodiment of a distillation apparatus according to the invention having two cells I and II disposed in the bottom of the column K and a third cell III disposed outside the column K and configured as a separate apparatus, namely as a phase separator. From said cell a vapor stream 6 is once again recycled into the lower region of the column K, above the liquid level therein, and a substream of the liquid is recycled into the cell II integrated into the bottom of the column K.

FIG. 2A is a detail view of the plant from FIG. 2, namely of the arrangement composed of cell III and the associated heat exchanger WT2.

This arrangement may be replaced with the alternatives depicted in FIGS. 2B/2C: As an alternative FIG. 2B shows a falling film evaporator having an integrated tube bundle heat exchanger which in this embodiment constitutes the evaporator stage WT1 and a liquid-traversed bottom region which constitutes the liquid-traversed cell III. In this embodiment the liquid flows through the heated tubes of the integrated heat exchanger, partially evaporates, and is divided into a vapor stream 6 and two liquid substreams 7 and 3.

The embodiment in FIG. 2C shows a kettle evaporator which comprises a tube bundle disposed in a container and corresponds to the evaporator stage WT1. The tubes heated with a secondary heat-transfer medium heat the liquid and partially evaporate said liquid to afford a gaseous stream 6 and two liquid streams 7 and 3 in the region of the kettle evaporator which is separated by a weir from the region in which the tube bundle heat exchanger is disposed.

FIG. 3 shows a schematic representation of a further preferred embodiment of a distillation apparatus having two cells II and III which are disposed outside the column K and are both phase separators. From the cell II the vapor stream 8 is recycled into the lower region of the column K, above the liquid level therein, and a substream of the liquid, stream 9, is recycled into the column K below the liquid level, into the cell I. From the cell III the vapor stream 6 is likewise recycled into the lower region of the column K, above the liquid level therein, and a substream of the liquid, stream 7, is recycled into the cell II, below the liquid level therein.

FIG. 4 shows a variant of the embodiment depicted in FIG. 3, wherein the two units which are disposed outside the column K and are each formed from a cell and an evaporator are falling film evaporators. Here the tube bundle heat exchanger of the falling film evaporator in each case forms the evaporator stage (WT1, WT2) and the bottom region of the falling film evaporator forms the liquid-traversed cells II/III. Unlike in the embodiment in FIG. 3, the vapor stream from the cell III is supplied as stream 10 to the cell II above the liquid level therein and not to the column K as in the embodiment in FIG. 3.

FIG. 5 shows a further preferred embodiment of a distillation apparatus according to the invention having two cells II and III disposed outside the column K and having a common circulation. In this embodiment the complete liquid stream from the cell II is supplied to the second heat exchanger WT2.

FIGS. 7 and 8 show prior art configurations.

According to the embodiment depicted in FIG. 7, the column bottom is merely divided into two parts, into two cells I and II, and the bottoms liquid withdrawn from cell I is heated in two stages in two tube bundle heat exchangers arranged one on top of the other. This further increases the in each case considerable height of a corresponding large industrial scale distillation plant to ranges that may become critical for stability reasons.

The embodiment depicted in FIG. 8 shows a further variant of a prior art distillation apparatus likewise having a column K bottom divided into two parts. The bottoms liquid from the first cell I is supplied in two stages to two serially disposed tube bundle heat exchangers. The biphasic vaporous/liquid mixture needs to be supplied to the second horizontal tube bundle heat exchanger from below and thus enters into the interior of the tube bundle heat transferor via one or more punctiform sites via the cylinder shell. The surface that said mixture flows against expands continuously until it reaches the maximum width corresponding to the diameter of the apparatus, and subsequently contracts again. It is thus not possible to achieve a uniform distribution of the biphasic vapor/liquid mixture for this embodiment.

The embodiment depicted in FIG. 9 shows a further variant of a prior art distillation apparatus likewise having a column K bottom divided into two parts. The bottoms stream from the cell I which is first in the direction of flow is withdrawn in liquid form. The bottoms stream is applied via a conveying pump to heat exchanger WT1 in which the bottoms stream is heated. The bottoms stream is then decompressed and thus partially evaporated. The thus obtained part-evaporated stream 4 is supplied to the second cell II. The heating medium supplied to heat exchanger WT1 is regenerated extractant 15.

FIG. 10 shows a schematic representation of a preferred embodiment of a distillation apparatus according to the invention with a column K for fractionating a feed stream 1 into a tops product stream 2 with a bottoms product stream 3, with three serially liquid traversed cells I, II and III, wherein all liquid-traversed cells I-III are integrated into the bottom of the column K and are separated from one another by weirs. The bottoms stream from the cell I which is first in the direction of flow is withdrawn in liquid form. The bottoms stream is applied via a conveying pump to heat exchanger WT1 in which the bottoms stream is heated. The bottoms stream is then decompressed and thus partially evaporated. The thus obtained part-evaporated stream 4 is supplied to the second cell II. The bottoms stream from the second cell II is likewise withdrawn in liquid form. The bottoms stream withdrawn from the second cell II is applied via a conveying pump to heat exchanger WT2 in which the bottoms stream is heated. The bottoms stream is then decompressed and thus partially evaporated. The thus obtained part-evaporated stream 5 is supplied to the third cell III. The heating medium supplied to heat exchanger WT1 is regenerated extractant 15 and the heating medium supplied to heat exchanger WT2 is partially cooled regenerated extractant 16.

Illustrative Embodiments

The examples which follow relate in each case to an extractive distillation for butanes/butenes separation using an aqueous N-methylpyrrolidone (NMP) solution in a column, as described in WO 2012/117085 A1. Due to a previous absorption step the butanes/butenes are already partially dissolved in an NMP solution and due to a decompression of this solution to a lower pressure the feed (stream 1) into the extractive distillation is biphasic and comprises a gas phase composed predominantly of butanes and butenes and the NMP solution comprising a dissolved butane/butene component.

It is a requirement of the separation in the extractive distillation column to obtain a tops product stream 2 which comprises 6 mol % of dissolved butenes and butadienes. It is also a requirement that a bottoms product stream be obtained where the fraction of dissolved butenes and butadienes is 82.9 mol % based on the total amount of non-solvent components. This separation is achieved with all variants described hereinbelow.

The setup was calculated with a simulation program proprietary to BASF (similar to the commercially available simulator ASPEN plus) based on phase equilibrium models. Simulation of the distillation column was performed using the equilibrium step model. The phase equilibria were described using the non-random two-liquid model (Renon H., Prausnitz J. M.: *Local Compositions in Thermodynamic Excess Functions for Liquid Mixtures*, AIChE J., 14(1), pp. 135-144, 1968).

The results of the simulation calculation which follow in each case consider a distillation column having 32 theoretical plates (i.e. equilibrium stages). The numbering proceeds from bottom (1) to top (32) and does not include the column bottom. The evaporators are modelled as equilibrium stages. The gas streams from the evaporators, the outlet of which is directly connected to the column, are introduced directly onto plate 1 of the column. The cells are a constituent of gas-liquid separators and are likewise represented as equilibrium stages. Only liquid streams are introduced into these equilibrium stages and gas thus formed is likewise introduced into the column onto plate 1.

Comparative Example 1

Table 1 gives a summary of the phases, concentrations, temperatures and pressures of the streams corresponding to FIG. 7 according to the prior art (with two serially connected heat exchangers) where the evaporator at the bottom of the column is divided into two evaporators WT1 and WT2 in order to be able to use energy from the regenerated solvent in WT1 before said solvent is cooled further, one part thereof is recycled as solvent for the absorption step and the other part thereof is recycled as stream 13 into the extractive distillation column (see WO 2012/117085 A1).

At the top of the column (onto the uppermost plate) reflux (stream 14) from the subsequent condensers is fed into the column, said reflux being composed essentially of butane. At a point somewhat lower than this feed point (about 1-3 theoretical plates lower, here: 2) the regenerated aqueous NMP solution is introduced as extractant (stream 13). The liquid fraction of the feed stream (stream 1) is introduced onto plate 18 and the gaseous fraction is introduced onto plate 19.

The solvent 11 which flows out of the column and is laden with essentially butanes and butenes is mixed with the overflow from cell II and gas thus formed goes onto the lowest plate of the column. The evaporator WT1 is supplied with liquid from cell I. The biphasic (gaseous and liquid) stream 4 needs to be uniformly distributed onto the heat exchanger WT2 to ensure uniform and effective heat transfer. The stream is further heated and partially evaporated in evaporator WT2. The gas phase formed ascends to the first plate of the column and the liquid is passed into cell II. Therein the bottoms product 3 is withdrawn and the excess liquid flows over the weir into cell 1. The liquid circulation rate (mass flow of stream 11) is often of a magnitude such that between 2% and 20% of the stream, in particular 5-15%, is converted into the gas phase in the evaporators.

Example 1 (Inventive)

The streams in the variant according to the invention with partial recycling of the liquid from the cells II and III into the respective preceding cells (I and II) are shown in table 2 which follows and in FIG. 1.

Example 2 (Inventive)

A further inventive variant where only liquid from cell III is partially recycled into cell I is shown in table 3 which follows and in FIG. 6.

Both variants achieve the same separation as according to the comparative example 1 but do not have the disadvantage that either the biphasic stream needs to be distributed or else the column needs to be made extremely tall due to an arrangement of one evaporator on top of another as vertical evaporators.

The variants according to the invention have the further advantage that both the inlet temperature and the outlet temperature for the heat exchanger WT1 is lower than in the comparative example 1 although the same amount of heat is transferred. These temperatures are shown in table 4. The variance both at the inlet and at the outlet is more than 10 degrees Kelvin for the variant according to FIG. 1 and about 4 degrees Kelvin for the variant according to FIG. 6. Hence a higher driving temperature gradient is available and transfer of the same amount of heat thus requires a smaller heat-transfer surface area. Alternatively, it would in principle also be possible in these variants either to obtain more heat from the regenerated solvent used for heating, i.e. said solvent could be cooled further or else heat could be recovered from another process stream at a temperature level about 10 degrees lower (for the variant according to FIG. 1).

Example 3 (Inventive)

An extractive distillation process for extracting 1,3-butadiene from a $C_4$ mixture (butanes, butenes, butadiene, $C_4$ acetylenes+small amounts of $C_3$, $C_{5+}$ molecules) was simulated for a distillation apparatus according to FIG. 10 with a bottoms product stream (stream 3) of 380 t/h. The temperatures of individual streams are reported below:

Regenerated extractant 15: 150.4° C.
Partially cooled regenerated extractant 16: 138.6° C.
Cooled extractant 17: 90.2° C.

The bottoms streams were heated from 68° C. to 180° C. in WT1 and from 95° C. to 106° C. in WT2 (the temperatures achieved upon heating relate to the bottoms stream flowing out from the respective heat exchanger prior to the decompression thereof). The temperature of the liquid bottoms product stream 3 was 104° C. On account of the high driving temperature gradients a total area of only 878 m² is required for heat transfer.

Comparative Example 2

Performing the same simulation as for example 3 but with a distillation apparatus according to FIG. 9 showed that under the same criteria (same composition, amount and temperature of the streams flowing in and flowing out) a 13.6% larger area is required for heat transfer.

TABLE 1

| | | stream | | | | | |
|---|---|---|---|---|---|---|---|
| | | 1 | 1 | 13 | 14 | 11 | 4 |
| stream type | | liquid | gas | liquid | liquid | liquid | liquid |
| from | | | | | | cell I | WT1 |
| to | | column, plate 18 | column, plate 19 | column, plate 30 | column, plate 32 | WT1 | WT2 |
| temperature | ° C. | 55 | 55 | 35.308 | 40.185 | 82.221 | 121.002 |
| pressure | bar | 5.4 | 5.4 | 7 | 5.4 | 5.41 | 5.51 |
| flow rate | kmol/h | 7429 | 304.4 | 9452 | 25.37 | 22200 | 21290 |
| mass flow | kg/h | 524300 | 16890 | 681900 | 1456 | 1545000 | 1499000 |

TABLE 1-continued

| concentrations | unit | | | | | |
|---|---|---|---|---|---|---|
| low boilers | mol/mol | 0.002171 | 0.067389 | 0.000027 | 0.018012 | 0.000078 | 0.000062 |
| C5+ | mol/mol | 0.000754 | 0.000196 | 0.00076 | 0.00016 | 0.000824 | 0.000816 |
| butanes | mol/mol | 0.052575 | 0.637443 | 0 | 0.91135 | 0.012787 | 0.005979 |
| butenes (inc. butadiene) | mol/mol | 0.043933 | 0.284611 | 0.000042 | 0.062215 | 0.061195 | 0.03518 |
| H2O | mol/mol | 0.300366 | 0.00992 | 0.332384 | 0.008228 | 0.324499 | 0.332066 |
| NMP | mol/mol | 0.600202 | 0.000441 | 0.666785 | 0.000035 | 0.600616 | 0.625897 |

| | | stream | | | | |
|---|---|---|---|---|---|---|
| | | 4 | 8 | 8 | 5 | 3 |
| stream type | | gas | liquid | gas | gas | liquid |
| from | | WT1 | WT2 | WT2 | column, plate 32 | cell II |
| to | | WT2 | cell II | column, plate 1 | | |
| temperature | ° C. | 121.002 | 148.346 | 148.346 | 49.375 | 148.346 |
| pressure | bar | 5.51 | 5.41 | 5.41 | 5.3 | 5.41 |
| flow rate | kmol/h | 911.5 | 20477 | 1722 | 622.4 | 16590 |
| mass flow | kg/h | 46700 | 1467700 | 77270 | 35150 | 1189000 |

| concentrations | unit | | | | | |
|---|---|---|---|---|---|---|
| low boilers | mol/mol | 0.000451 | 0.000054 | 0.000369 | 0.058598 | 0.000054 |
| C5+ | mol/mol | 0.001001 | 0.000769 | 0.001475 | 0.000151 | 0.000769 |
| butanes | mol/mol | 0.171766 | 0.00387 | 0.118826 | 0.873327 | 0.00387 |
| butenes (inc. butadiene) | mol/mol | 0.668687 | 0.022766 | 0.518169 | 0.060001 | 0.022766 |
| H2O | mol/mol | 0.147818 | 0.323807 | 0.332736 | 0.007893 | 0.323807 |
| NMP | mol/mol | 0.010276 | 0.648735 | 0.028424 | 0.000033 | 0.648735 |

TABLE 2

| | | stream | | | | | |
|---|---|---|---|---|---|---|---|
| | | 1 | 1 | 13 | 14 | 11 | 4 |
| stream type | | liquid | gas | liquid | liquid | liquid | liquid |
| from | | | | | cell I | WT1 | WT1 |
| to | | column, plate 18 | column, plate 19 | column, plate 30 | column, plate 32 | WT1 | cell II |
| temperature | ° C. | 55 | 55 | 35.308 | 40.185 | 67.023 | 110.016 |
| pressure | bar | 5.4 | 5.4 | 7 | 5.4 | 5.41 | 5.41 |
| flow rate | kmol/h | 7429 | 304.4 | 9451 | 25.37 | 19460 | 18190 |
| mass flow | kg/h | 524300 | 16890 | 681800 | 1456 | 1355000 | 1287000 |

| concentrations | unit | | | | | | |
|---|---|---|---|---|---|---|---|
| low boilers | mol/mol | 0.002171 | 0.067389 | 0.000027 | 0.018012 | 0.000091 | 0.000065 |
| C5+ | mol/mol | 0.000755 | 0.000197 | 0.000761 | 0.00016 | 0.000795 | 0.000794 |
| butanes | mol/mol | 0.052575 | 0.637442 | 0 | 0.91135 | 0.021143 | 0.007906 |
| butenes (inc. butadiene) | mol/mol | 0.043933 | 0.284611 | 0.000042 | 0.062213 | 0.081794 | 0.040048 |
| H2O | mol/mol | 0.300365 | 0.00992 | 0.332384 | 0.008228 | 0.309476 | 0.323995 |
| NMP | mol/mol | 0.600201 | 0.000441 | 0.666784 | 0.000035 | 0.5867 | 0.627191 |

| | | stream | | | | | |
|---|---|---|---|---|---|---|---|
| | | 4 | 8 | 8 | 5 | 5 | 3 |
| stream type | | gas | liquid | liquid | gas | gas | liquid |
| from | | cell II | WT2 | column, plate 32 | cell III | | |
| to | | column, plate 1 | WT2 | column, plate 1 | | | |
| temperature | ° C. | 110.016 | 113.016 | 148.342 | 148.342 | 49.375 | 148.342 |
| pressure | bar | 5.41 | 5.41 | 5.41 | 5.41 | 5.3 | 5.41 |
| flow rate | kmol/h | 1270 | 18680 | 18091 | 589.8 | 622.4 | 16590 |
| mass flow | kg/h | 67210 | 1323000 | 1296600 | 26470 | 35150 | 1189000 |

TABLE 2-continued

| concentrations | unit | | | | | | |
|---|---|---|---|---|---|---|---|
| low boilers | mol/mol | 0.000473 | 0.000064 | 0.000054 | 0.000369 | 0.0513598 | 0.000054 |
| C5+ | mol/mol | 0.000813 | 0.000792 | 0.00077 | 0.001477 | 0.000151 | 0.00077 |
| butanes | mol/mol | 0.210724 | 0.0075 | 0.00387 | 0.118832 | 0.873326 | 0.00387 |
| butenes (inc. butadiene) | mol/mol | 0.679686 | 0.038412 | 0.022767 | 0.518198 | 0.06 | 0.022767 |
| H2O | mol/mol | 0.101526 | 0.324087 | 0.323806 | 0.332703 | 0.007893 | 0.323806 |
| NMP | mol/mol | 0.006779 | 0.629145 | 0.648733 | 0.028421 | 0.000033 | 0.648733 |

TABLE 3

| | | stream | | | | | |
|---|---|---|---|---|---|---|---|
| | | 1 | 1 | 13 | 14 | 11 | 12 |
| stream type | | liquid | gas | liquid | liquid | liquid | liquid |
| from | | | | | | cell I | B1, cell II |
| to | | column, plate 18 | column, plate 19 | column, plate 30 | column, plate 32 | WT1 | WT2 |
| temperature | ° C. | 55 | 55 | 35.308 | 40.185 | 78.65 | 117.38 |
| pressure | bar | 5.4 | 5.4 | 7 | 5.4 | 5.41 | 5.51 |
| flow rate | kmol/h | 7429 | 304.4 | 9450 | 25.37 | 22110 | 21140 |
| mass flow | kg/h | 524300 | 16890 | 681800 | 1456 | 1550000 | 1500000 |
| concentrations | unit | | | | | | |
| low boilers | mol/mol | 0.002171 | 0.067389 | 0.000027 | 0.018012 | 0.00008 | 0.000063 |
| C5+ | mol/mol | 0.000755 | 0.000197 | 0.000761 | 0.00016 | 0.000795 | 0.00079 |
| butanes | mol/mol | 0.052575 | 0.637443 | 0 | 0.91135 | 0.015456 | 0.00715 |
| butene,s (inc. butadiene) | mol/mol | 0.043933 | 0.284611 | 0.000042 | 0.062215 | 0.06447 | 0.036904 |
| H2O | mol/mol | 0.300365 | 0.00992 | 0.332384 | 0.008228 | 0.315461 | 0.32406 |
| NMP | mol/mol | 0.600201 | 0.000441 | 0.666784 | 0.000035 | 0.603737 | 0.631034 |

| | | stream | | | | |
|---|---|---|---|---|---|---|
| | | 8 | 5 | 5 | 2 | 3 |
| stream type | | gas | liquid | gas | gas | liquid |
| from | | B1 | WT2 | WT2 | column, plate 32 | cell III |
| to | | column, plate 1 | cell III | column, plate 1 | | |
| temperature | ° C. | 117.38 | 148.342 | 148.342 | 49.375 | 148.342 |
| pressure | bar | 5.51 | 5.41 | 5.41 | 5,3 | 5.41 |
| flow rate | kmol/h | 970.3 | 20540 | 603.1 | 622.4 | 16590 |
| mass flow | kg/h | 50430 | 1472200 | 27070 | 35150 | 1189000 |
| concentrations | unit | | | | | |
| low boilers | mol/mol | 0.000456 | 0.000054 | 0.000369 | 0.058598 | 0.000054 |
| C5+ | mol/mol | 0.000911 | 0.00077 | 0.001477 | 0.000151 | 0.00077 |
| butanes | mol/mol | 0.196414 | 0.003869 | 0.118833 | 0.873326 | 0.003869 |
| butene,s (inc. butadiene) | mol/mol | 0.66508 | 0.022768 | 0.518202 | 0.06 | 0.022768 |
| H2O | mol/mol | 0.128118 | 0.323806 | 0.332698 | 0.007893 | 0.323806 |
| NMP | mol/mol | 0.009021 | 0.648733 | 0.028421 | 0.000033 | 0.648733 |

TABLE 4

| | WT1 | | WT2 | |
|---|---|---|---|---|
| variant | Tin/° C. | Tout/° C. | Tin/° C. | Tout/° C. |
| FIG. 7 | 82.2 | 121.0 | 121.0 | 148.3 |
| FIG. 1 | 67.0 | 110.0 | 110.0 | 148.3 |
| FIG. 6 | 78.7 | 117.4 | 117.4 | 148.3 |

LIST OF REFERENCE NUMERALS

1, 13, 14 feed streams
2 tops product stream
3 bottoms product stream
4, 5 part-evaporated streams
6, 8, 10 vapor streams
7, 9, 11, 12 liquid substreams
15, 16, 17 regenerated extractant streams
K column
WT1, WT2 heat exchangers
W1, W2 weirs
I, II, III liquid-traversed cells

The invention claimed is:

1. A distillation apparatus comprising:
a column for fractionating a feed stream into a tops product stream, a bottoms product stream, and at least one side draw streams; and
at least three serially liquid-traversed cells, the at least three serially liquid-traversed cells being integrated into a bottom of the column for a partial-evaporation of liquid traversing the at least three serially liquid-traversed cells, wherein
the liquid from each of the at least three serially liquid-traversed cells, with the exception of a last cell of the at least three serially liquid-traversed cells, is passed through a respective evaporator stage and partially-evaporated therein to obtain a partially-evaporated stream in each respective evaporator stage, the partially-evaporated streams being supplied to a respective next downstream cell,
a direct flow of the liquid from a respective immediately preceding cell to the respective next downstream cell is prevented, and
a liquid reflux is provided from at least one of the at least three serially liquid-traversed cells, with the exception of the first cell, into the respective immediately preceding cell.

2. The distillation apparatus according to claim 1, wherein the partial-evaporation is effected by mass flows, the mass flows being hot condensate.

3. The distillation apparatus according to claim 1, wherein the liquid reflux is designed as an immersed feed.

4. The distillation apparatus according to claim 1, wherein the liquid reflux is designed as a siphon.

5. A distillation apparatus comprising:
a column for fractionating a feed stream into a tops product stream, a bottoms product stream, and optionally one or more side draw streams; and
three or more serially liquid-traversed cells, at least a first cell of the serially liquid-traversed cells being integrated into a bottom of the column, for a multistage heating and a partial-evaporation of liquid traversing the serially liquid-traversed cells, wherein
the liquid from each of the three or more serially liquid-traversed cells, with the exception of a last cell of the serially liquid-traversed cells, is passed through a respective evaporator stage and partially-evaporated therein to obtain a partially-evaporated stream in each respective evaporator stage, the partially-evaporated streams being completely or partially supplied to a respective next downstream cell,
a direct flow of the liquid from a respective immediately preceding cell to the respective next downstream cell is prevented,
a liquid reflux is provided from at least one of the three or more serially liquid-traversed cells, with the exception of the first cell, into the respective immediately preceding cell, and
wherein all of the three or more serially liquid-traversed cells are integrated into the bottom of the column.

6. The distillation apparatus according to claim 5, wherein the heating and partial-evaporation is effected by at least one of in-process and external energy sources.

7. The distillation apparatus according to claim 5, wherein the heating and partial-evaporation is effected by mass flows.

8. The distillation apparatus according to claim 7, wherein the mass flows are steam or hot condensate.

9. The distillation apparatus according to claim 7, wherein the mass flows are hot condensate.

10. The distillation apparatus according to claim 5, wherein
the heating and the partial-evaporation of the liquid traversing the first cell is effected using in-process mass flows, and
the heating and partial-evaporation of the liquid traversing a penultimate cell is effected using external energy sources.

11. The distillation apparatus according to claim 5, wherein the respective evaporator stages are heat exchangers.

12. The distillation apparatus according to claim 5, wherein the liquid reflux is designed as a direct liquid overflow over a weir, as an immersed feed or as a siphon.

13. A process for performing a distillation or an extractive distillation using a distillation apparatus according to claim 5, in which a feed stream comprising a plurality of components is fractionated into a tops product stream, a bottoms product stream, and optionally one or more side draw streams.

14. The process according to claim 13, wherein the feed stream is fractionated by extractive distillation such that the tops product stream comprises butane(s) and the bottoms product stream comprises butene(s), and optionally butadiene(s).

15. The process according to claim 14, wherein the process is an extractive distillation for fractionating a reaction mixture from a dehydrogenation of butanes to produce butenes or from an oxydehydrogenation of butanes to produce butadiene.

16. The process according to claim 13, wherein the feed stream is fractionated by extractive distillation such that the tops product stream comprises butene(s) and optionally butane(s) and the bottoms product stream comprises butadiene(s).

17. The distillation apparatus according to claim 5, wherein the liquid reflux is designed as an immersed feed.

18. The distillation apparatus according to claim 5, wherein the liquid reflux is designed as a siphon.

* * * * *